(12) United States Patent
Balan et al.

(10) Patent No.: US 7,721,554 B2
(45) Date of Patent: May 25, 2010

(54) AIRCRAFT AUXILIARY GAS TURBINE ENGINE AND METHOD FOR OPERATING

(75) Inventors: Chellappa Balan, Niskayuna, NY (US); Karl Edward Sheldon, Rexford, NY (US)

(73) Assignee: General Electric Company, Schenectady, NY (US)

( * ) Notice: Subject to any disclaimer, the term of this patent is extended or adjusted under 35 U.S.C. 154(b) by 1057 days.

(21) Appl. No.: 11/345,950

(22) Filed: Feb. 2, 2006

(65) Prior Publication Data

US 2007/0175223 A1  Aug. 2, 2007

(51) Int. Cl.
*F02C 6/04* (2006.01)
(52) U.S. Cl. .............. 60/785; 244/58; 60/802
(58) Field of Classification Search .......... 60/782, 60/785, 39.83, 802, 795; 244/58; 62/DIG. 5; 454/71, 76
See application file for complete search history.

(56) References Cited

U.S. PATENT DOCUMENTS

| 4,261,416 | A | * | 4/1981 | Hamamoto | 165/271 |
|---|---|---|---|---|---|
| 4,419,926 | A | * | 12/1983 | Cronin et al. | 454/74 |
| 4,684,081 | A | * | 8/1987 | Cronin | 244/58 |
| 5,442,905 | A | * | 8/1995 | Claeys et al. | 60/785 |
| 5,899,085 | A | * | 5/1999 | Williams | 62/236 |
| 5,956,960 | A | * | 9/1999 | Niggeman | 62/172 |
| 5,967,461 | A | * | 10/1999 | Farrington | 244/118.5 |
| 6,216,981 | B1 | * | 4/2001 | Helm | 244/118.5 |
| 6,283,410 | B1 | | 9/2001 | Thompson | |
| 6,305,156 | B1 | * | 10/2001 | Lui | 60/785 |
| 6,634,596 | B2 | | 10/2003 | Albero et al. | |
| 6,704,625 | B2 | | 3/2004 | Albero et al. | |
| 6,834,831 | B2 | * | 12/2004 | Daggett | 244/58 |
| 6,868,664 | B2 | | 3/2005 | Albero et al. | |
| 2004/0144096 | A1 | | 7/2004 | Wollenweber | |
| 2007/0220900 | A1 | * | 9/2007 | Shockling et al. | 60/802 |
| 2007/0234731 | A1 | * | 10/2007 | Sheldon et al. | 60/772 |
| 2008/0098747 | A1 | * | 5/2008 | Sheldon et al. | 60/802 |

* cited by examiner

*Primary Examiner*—William H Rodriguez
(74) *Attorney, Agent, or Firm*—William Scott Andes

(57) ABSTRACT

A non-aircraft-propelling auxiliary gas turbine engine installable in an aircraft having a cabin adapted to be pressurized. The auxiliary gas turbine engine includes an auxiliary-gas-turbine-engine compressor having an inlet, wherein the inlet is adapted to receive pressurized air from the cabin. A method for operating a non-aircraft-propelling auxiliary gas turbine engine of an aircraft includes providing pressurized air from the cabin of the aircraft to an inlet of a compressor of the auxiliary gas turbine engine. The method includes providing compressed air from the compressor to a combustor of the auxiliary gas turbine engine and includes providing combustion gases from the combustor to a turbine of the auxiliary gas turbine engine, wherein the turbine is mechanically coupled to the compressor.

15 Claims, 1 Drawing Sheet

US 7,721,554 B2

AIRCRAFT AUXILIARY GAS TURBINE ENGINE AND METHOD FOR OPERATING

BACKGROUND OF THE INVENTION

The present invention relates generally to gas turbine engines, and more particularly to a non-aircraft-propelling auxiliary gas turbine engine of an aircraft and to a method for operating such an engine.

Known auxiliary gas turbine engines are installed in some aircraft to provide mechanical shaft power to electrical and hydraulic equipment such as electrical power generators and alternators and hydraulic pumps. The inlet of the compressor of such auxiliary gas turbine engines receives air from the atmosphere. Because the density of air decreases with increasing altitude, such auxiliary gas turbine engines, at increased altitude, must either work harder to produce a desired shaft power resulting in an increased operating temperature or must reduce the output shaft power to stay within an operating temperature limit.

Still, scientists and engineers continue to seek improved non-aircraft-propelling auxiliary gas turbine engines for aircraft and improved methods for operating such engines.

BRIEF DESCRIPTION OF THE INVENTION

A first expression of a first embodiment of the invention is for a non-aircraft-propelling auxiliary gas turbine engine installable in an aircraft, wherein the aircraft has an aircraft-propelling gas turbine engine and has a cabin adapted to be pressurized. The auxiliary gas turbine engine includes an auxiliary-gas-turbine-engine compressor having an inlet. The inlet is adapted to receive pressurized air from the cabin.

A second expression of a first embodiment of the invention is for a non-aircraft-propelling auxiliary gas turbine engine of an aircraft, wherein the aircraft has an aircraft-propelling gas turbine engine and has a pressurized cabin. The auxiliary gas turbine engine includes an auxiliary-gas-turbine-engine compressor having an inlet. The inlet receives pressurized air from the cabin.

A method of the invention is for operating a non-aircraft-propelling auxiliary gas turbine engine of an aircraft, wherein the aircraft has an aircraft-propelling gas turbine engine and has a cabin adapted to be pressurized. The method includes providing pressurized air from the cabin to an inlet of a compressor of the auxiliary gas turbine engine. The method includes providing compressed air from the compressor to a combustor of the auxiliary gas turbine engine. The method includes providing combustion gases from the combustor to a turbine of the auxiliary gas turbine engine, wherein the turbine is mechanically coupled to the compressor.

BRIEF DESCRIPTION OF THE DRAWINGS

The accompanying drawings illustrate an embodiment of the invention wherein.

DETAILED DESCRIPTION OF THE INVENTION

Figure 1:
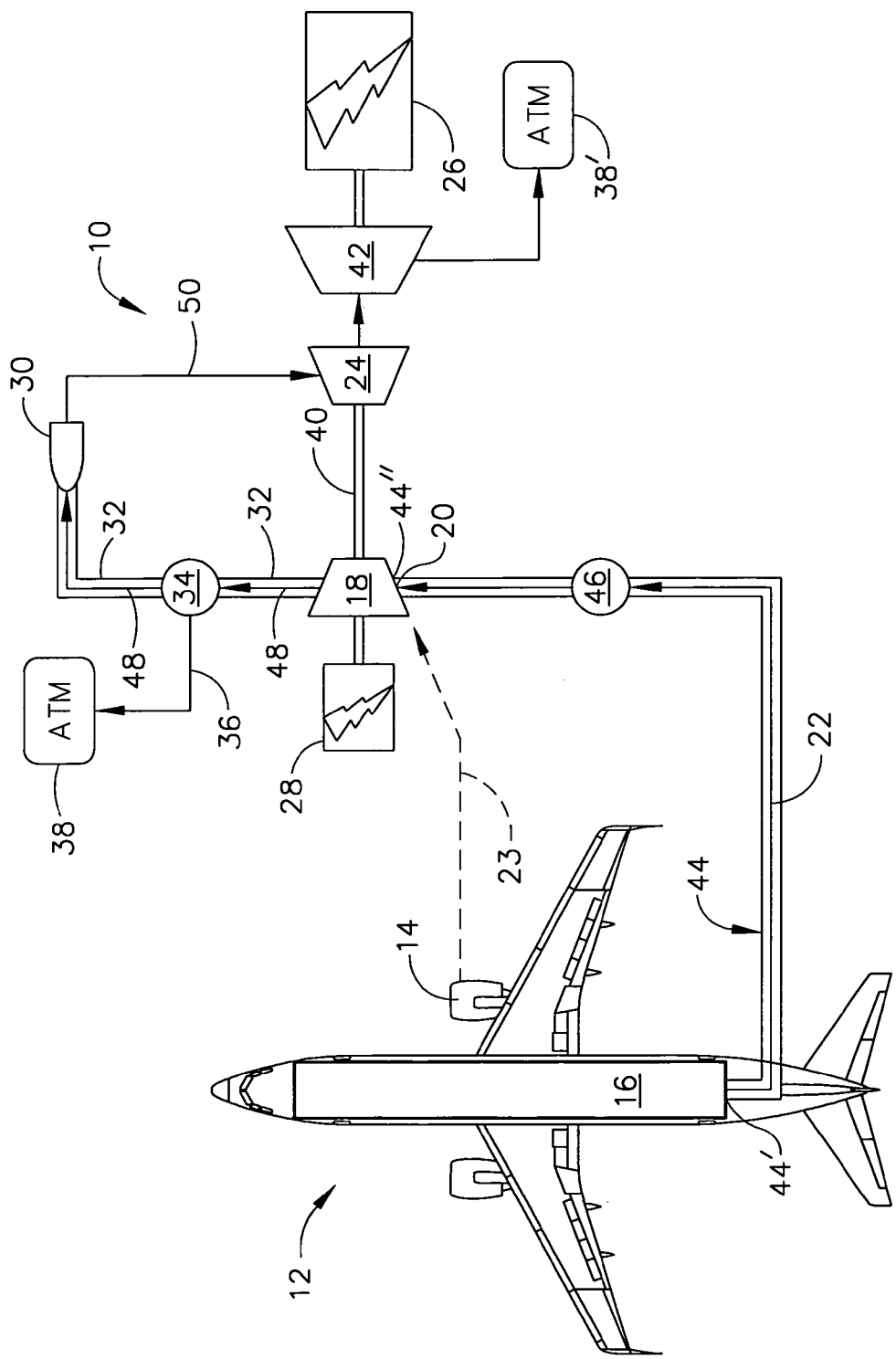
FIG. 1 is a schematic representation of an embodiment of an aircraft having an aircraft-propelling gas turbine engine and having a non-aircraft-propelling auxiliary gas turbine engine connected to two electrical generators.

Referring now to the drawings, FIG. 1 discloses a first embodiment of the invention. A first expression of the embodiment of FIG. 1 is for a non-aircraft-propelling auxiliary gas turbine engine 10 installable in an aircraft 12, wherein the aircraft 12 has an aircraft-propelling gas turbine engine 14 and has a cabin 16 adapted to be pressurized. The auxiliary gas turbine engine 10 includes an auxiliary-gas-turbine-engine compressor 18 having an inlet 20. The inlet 20 is adapted to receive pressurized air 22 from the cabin 16. It is noted that an aircraft-propelling gas turbine engine of an aircraft is an aircraft gas turbine engine whose main purpose is aircraft propulsion and that a non-aircraft-propelling gas turbine engine of an aircraft is an aircraft gas turbine engine whose main purpose is not aircraft propulsion.

In a first enablement of the first expression of the embodiment of FIG. 1, the inlet 20 of the compressor 18 is adapted to receive bleed air 23 (shown in dashed line) from the aircraft-propelling gas turbine engine 14. In one example, such bleed air 23 is compressed air from a compressor (not shown) of the aircraft-propelling gas turbine engine 14. In another example, such bleed air 23 is compressed air from a bypass duct (not shown) of the aircraft-propelling gas turbine engine 14. In another example, such bleed air is a combination of compressed air from a compressor, and compressed air from a bypass duct, of the aircraft-propelling gas turbine engine. Other examples are left to the artisan.

In one implementation of the first expression of the embodiment of FIG. 1, the auxiliary gas turbine engine 10 also includes an auxiliary-gas-turbine-engine turbine 24. The turbine 24 is mechanically coupled to the compressor 18 and is operatively connected to an electric power generator 26. In one variation, the auxiliary gas turbine engine 10 is also operatively connected to a second electric power generator 28.

In a first application of the first expression of the embodiment of FIG. 1, the auxiliary gas turbine engine 10 also includes an auxiliary-gas-turbine-engine combustor 30, wherein the compressor 18 includes an outlet duct 32 in fluid communication with the combustor 30, and wherein the outlet duct 32 includes a variable-area bleed valve 34 adapted to release air 36 from the outlet duct 32 to the atmosphere 38. In a second application, the auxiliary gas turbine engine 10 includes an auxiliary-gas-turbine-engine combustor 30, wherein the compressor 18 includes an outlet duct 32 in fluid communication with the combustor 30, and wherein the outlet duct 32 is a variable-area outlet duct. In one example of either or both of these applications, the variable-area bleed valve and/or the variable-area outlet duct is operated to prevent the auxiliary gas turbine engine 10 from stalling (from back flow to the cabin) or from surging (from a pressure spike from the cabin), as can be appreciated by those skilled in the art.

In a first arrangement of the first expression of the embodiment of FIG. 1, the inlet 20 is an acoustically-treated inlet. Acoustic treatment of aircraft components is well known, such as acoustic treatment to reduce noise from aircraft-propelling gas turbine engines which reaches passengers within the cabin of the aircraft. Examples of acoustic treatment of aircraft components are left to the artisan.

In one construction of the first expression of the embodiment of FIG. 1, the compressor 18 is a high-pressure compressor supplying compressed air to the combustor 30, the turbine 24 is a high-pressure turbine mechanically coupled to the high-pressure compressor by a shaft 40, and the auxiliary gas turbine engine 10 includes a low-pressure turbine 42 (which, in one example, discharges gas to the atmosphere 38') as shown. The operation of such components is well known in the art. It is noted that the flow of gas in FIG. 1 is indicated by arrowed lines.

In one deployment of the first expression of the embodiment of FIG. 1, the auxiliary gas turbine engine 10 includes a connection duct 44. The connection duct 44 has an entrance 44' and an exit 44". The entrance 44' is adapted to receive pressurized air 22 from the cabin 16. The inlet 20 of the compressor 18 is adapted to receive pressurized air 22 from the cabin 16 by being connectable to the exit 44" of the connection duct 44.

In one extension of the first expression of the embodiment of FIG. 1, there is included a system (not shown) for enhancing the use of cabin air provided to the inlet of the compressor of the auxiliary gas turbine engine. The system includes a system turbine which has an inlet adapted to receive cabin air and has an outlet in fluid communication with the inlet of the compressor of the auxiliary gas turbine engine. The system includes a system compressor, mechanically coupled to the system turbine, which has an inlet adapted to receive air from the atmosphere and which has an outlet in fluid communication with the inlet of the compressor of the auxiliary gas turbine engine. The atmospheric air is entrained and compressed, wherein the outlets of the system turbine and the system compressor have substantially the same pressure and are combined to deliver a greater mass flow to the inlet of the compressor of the auxiliary gas turbine engine, as can be appreciated by those skilled in the art. In one variation, a heat exchanger (not shown) is used to receive waste heat from the aircraft (such as from a cooling system) and to give up heat to the pressurized air which has left the cabin but has not yet entered the system compressor.

A second expression of the embodiment of FIG. 1 is for a non-aircraft-propelling auxiliary gas turbine engine 10 of an aircraft 12, wherein the aircraft 12 has an aircraft-propelling gas turbine engine 14 and has a pressurized cabin 16. The auxiliary gas turbine engine 10 includes an auxiliary-gas-turbine-engine compressor 18 having an inlet 20. The inlet 20 receives pressurized air 22 from the cabin 16. It is noted that an aircraft-propelling gas turbine engine of an aircraft is an aircraft gas turbine engine whose main purpose is aircraft propulsion and that a non-aircraft-propelling gas turbine engine of an aircraft is an aircraft gas turbine engine whose main purpose is not aircraft propulsion.

In a first enablement of the second expression of the embodiment of FIG. 1, the inlet 20 of the compressor 18 receives bleed air 23 (shown in dashed line) from the aircraft-propelling gas turbine engine 14. In one example, such bleed air 23 is compressed air from a compressor (not shown) of the aircraft-propelling gas turbine engine 14. In another example, such bleed air 23 is compressed air from a bypass duct (not shown) of the aircraft-propelling gas turbine engine 14. In another example, such bleed air is a combination of compressed air from a compressor, and compressed air from a bypass duct, of the aircraft-propelling gas turbine engine. Other examples are left to the artisan.

In one implementation of the second expression of the embodiment of FIG. 1, the auxiliary gas turbine engine 10 also includes an auxiliary-gas-turbine-engine turbine 24. The turbine 24 is mechanically coupled to the compressor 18 and is operatively connected to an electric power generator 26. In one variation, the auxiliary gas turbine engine 10 is also operatively connected to a second electric power generator 28.

In a first application of the second expression of the embodiment of FIG. 1, the auxiliary gas turbine engine 10 also includes an auxiliary-gas-turbine-engine combustor 30, wherein the compressor 18 includes an outlet duct 32 in fluid communication with the combustor 30, and wherein the outlet duct 32 includes a variable-area bleed valve 34 adapted to release air 36 from the outlet duct 32 to the atmosphere 38. In a second application, the auxiliary gas turbine engine 10 includes an auxiliary-gas-turbine-engine combustor 30, wherein the compressor 18 includes an outlet duct 32 in fluid communication with the combustor 30, and wherein the outlet duct 32 is a variable-area outlet duct. In one example of either or both of these applications, the variable-area bleed valve and/or the variable-area outlet duct is operated to prevent the auxiliary gas turbine engine 10 from stalling (from back flow to the cabin) or from surging (from a pressure spike from the cabin), as can be appreciated by those skilled in the art.

In a first arrangement of the second expression of the embodiment of FIG. 1, the inlet 20 is an acoustically-treated inlet. Acoustic treatment of aircraft components is well known, such as acoustic treatment to reduce noise from aircraft-propelling gas turbine engines which reaches passengers within the cabin of the aircraft. Examples of acoustic treatment of aircraft components are left to the artisan.

In one construction of the second expression of the embodiment of FIG. 1, the compressor 18 is a high-pressure compressor supplying compressed air to the combustor 30, the turbine 24 is a high-pressure turbine mechanically coupled to the high-pressure compressor by a shaft 40, and the auxiliary gas turbine engine 10 includes a low-pressure turbine 42 (which, in one example, discharges gas to the atmosphere 38') as shown. The operation of such components is well known in the art. It is noted that the flow of gas in FIG. 1 is indicated by arrowed lines.

In one deployment of the second expression of the embodiment of FIG. 1, the auxiliary gas turbine engine 10 also includes a connection duct 44 connecting the inlet 20 to the cabin 16, wherein the inlet 20 receives the pressurized air 22 from the cabin 16 through the connection duct 44. In one variation, the auxiliary gas turbine engine 10 also includes a one-way valve 46 disposed in the connection duct 44. In the same or a different variation, the connection duct 44 is acoustically-tuned to provide at least some noise isolation between the compressor 18 and the cabin 16.

A method of the invention is for operating a non-aircraft-propelling auxiliary gas turbine engine 10 of an aircraft 12, wherein the aircraft 12 has an aircraft-propelling gas turbine engine 14 and has a cabin 16 adapted to be pressurized. The method includes providing pressurized air 22 from the cabin 16 to an inlet 20 of a compressor 18 of the auxiliary gas turbine engine 10. The method includes providing compressed air 48 from the compressor 18 to a combustor 30 of the auxiliary gas turbine engine 10. The method includes providing combustion gases 50 from the combustor 30 to a turbine 24 of the auxiliary gas turbine engine 10, wherein the turbine 24 is mechanically coupled to the compressor 18.

In one employment, the method also includes operatively connecting the auxiliary gas turbine engine 10 to an electric power generator 26. In the same or a different utilization, the method also includes operatively connecting the auxiliary gas turbine engine 10 to an alternator (not shown). In the same or a different utilization, the method also includes operatively connecting the auxiliary gas turbine engine 10 to a hydraulic pump (not shown).

In one enactment, the method also includes providing bleed air 23 from the aircraft-propelling gas turbine engine 14 to the inlet 20. In one variation of this enactment, the method also includes operatively connecting the auxiliary gas turbine engine 10 to an electric power generator 26.

In one utilization, the compressor 18 includes an outlet duct 32. The provided compressed air 48 from the compressor 18 to the combustor 30 is provided through the outlet duct 32.

The outlet duct 32 is sized to reduce back pressure from the compressor 18 to the cabin 16, as can be appreciated by those skilled in the art.

While the present invention has been illustrated by a description of a method and several expressions of an embodiment, it is not the intention of the applicants to restrict or limit the spirit and scope of the appended claims to such detail. Numerous other variations, changes, and substitutions will occur to those skilled in the art without departing from the scope of the invention.

The invention claimed is:

1. A non-aircraft-propelling auxiliary gas turbine engine installable in an aircraft, wherein the aircraft has an aircraft-propelling gas turbine engine and has a cabin adapted to be pressurized, wherein the auxiliary gas turbine engine comprises an auxiliary-gas-turbine-engine compressor having an inlet, and wherein the inlet is adapted to receive pressurized air from the cabin, also including an auxiliary-gas-turbine-engine combustor, wherein the compressor includes an outlet duct in fluid communication with the combustor, and wherein the outlet duct includes one of a variable-area bleed valve adapted to bleed air from the outlet duct to the atmosphere and a variable-area outlet duct.

2. The auxiliary gas turbine engine of claim 1, wherein the inlet is adapted to additionally receive bleed air from the aircraft-propelling gas turbine engine.

3. The auxiliary gas turbine engine of claim 1, also including an auxiliary-gas-turbine-engine turbine mechanically coupled to the compressor and operatively connected to an electric power generator.

4. The auxiliary gas turbine engine of claim 1, wherein the inlet is an acoustically-treated inlet.

5. A non-aircraft-propelling auxiliary gas turbine engine of an aircraft, wherein the aircraft has an aircraft-propelling gas turbine engine and has a pressurized cabin, wherein the auxiliary gas turbine engine comprises an auxiliary-gas-turbine-engine compressor having an inlet, and wherein the inlet receives pressurized air from the cabin, also including an auxiliary-gas-turbine-engine combustor, wherein the compressor includes an outlet duct in fluid communication with the combustor, and wherein the outlet duct includes one of a variable-area bleed valve adapted to release air from the outlet duct to the atmosphere and a variable-area outlet duct.

6. The auxiliary gas turbine engine of claim 5, wherein the inlet additionally receives bleed air from the aircraft-propelling gas turbine engine.

7. The auxiliary gas turbine engine of claim 5, also including an auxiliary-gas-turbine-engine turbine mechanically coupled to the compressor and operatively connected to an electric power generator.

8. The auxiliary gas turbine engine of claim 5, wherein the inlet is an acoustically-treated inlet.

9. The auxiliary gas turbine engine of claim 5, also including a connection duct connecting the inlet to the cabin, wherein the inlet receives the pressurized air from the cabin through the connection duct.

10. The auxiliary gas turbine engine of claim 9, also including a one-way valve disposed in the connection duct.

11. The auxiliary gas turbine engine of claim 9, wherein the connection duct is acoustically-tuned to provide at least some noise isolation between the compressor and the cabin.

12. A method for operating a non-aircraft-propelling auxiliary gas turbine engine of an aircraft, wherein the aircraft has an aircraft-propelling gas turbine engine and has a cabin adapted to be pressurized, and wherein the method comprises:
   a) providing pressurized air from the cabin to an inlet of a compressor of the auxiliary gas turbine engine;
   b) providing bleed air from the aircraft-propelling gas turbine engine to the inlet;
   c) providing compressed air from the compressor to a combustor of the auxiliary gas turbine engine; and
   d) providing combustion gases from the combustor to a turbine of the auxiliary gas turbine engine, wherein the turbine is mechanically coupled to the compressor.

13. The method of claim 12, also including operatively connecting the auxiliary gas turbine engine to an electric power generator.

14. The method of claim 12, also including operatively connecting the auxiliary gas turbine engine to an electric power generator.

15. The method of claim 12, wherein the compressor includes an outlet duct, wherein the provided compressed air from the compressor to the combustor is provided through the outlet duct, and wherein the outlet duct is sized to reduce back pressure from the compressor to the cabin.

* * * * *